(12) United States Patent
Yoshioka et al.

(10) Patent No.: US 8,667,781 B2
(45) Date of Patent: Mar. 11, 2014

(54) VEHICLE CONTROL DEVICE

(75) Inventors: Mamoru Yoshioka, Susono (JP);
Noriaki Kumagai, Susono (JP); Naoya Takagi, Mishima (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 229 days.

(21) Appl. No.: 13/321,739

(22) PCT Filed: Mar. 19, 2010

(86) PCT No.: PCT/JP2010/054845
§ 371 (c)(1),
(2), (4) Date: Nov. 21, 2011

(87) PCT Pub. No.: WO2011/114519
PCT Pub. Date: Sep. 22, 2011

(65) Prior Publication Data
US 2012/0060481 A1    Mar. 15, 2012

(51) Int. Cl.
*F01N 3/22* (2006.01)
(52) U.S. Cl.
USPC ............. 60/285; 60/289; 60/300; 60/303; 60/320; 123/325; 123/347; 123/348; 123/399; 123/403; 180/65.28; 180/65.285
(58) Field of Classification Search
USPC .......... 60/285, 286, 289, 299, 300, 303, 320; 123/325, 347, 348, 399, 403, 493; 701/22, 70, 103, 110, 112; 180/65.28, 180/65.285; 303/124, 152; 903/905
See application file for complete search history.

(56) References Cited

U.S. PATENT DOCUMENTS

| | | | | |
|---|---|---|---|---|
| 5,984,034 A | * | 11/1999 | Morisawa et al. | 180/65.28 |
| 7,398,148 B2 | * | 7/2008 | Yoshioka et al. | 701/103 |
| 2009/0048763 A1 | * | 2/2009 | Nishikiori et al. | 701/103 |
| 2010/0256849 A1 | * | 10/2010 | Akimoto | 701/22 |

FOREIGN PATENT DOCUMENTS

| JP | 05-269387 A | 10/1993 |
|---|---|---|
| JP | 2003-343321 A | 12/2003 |
| JP | 2008-291801 A | 12/2008 |

* cited by examiner

*Primary Examiner* — Thomas Denion
*Assistant Examiner* — Jorge Leon, Jr.
(74) *Attorney, Agent, or Firm* — Sughrue Mion, PLLC

(57) ABSTRACT

A vehicle control device applied to a vehicle including an internal combustion engine and an electrically heated catalyst which is warmed by applying a current, and includes a catalyst carrier supporting a catalyst and a carrier retention unit that retains the catalyst carrier and has an electrical insulation property. The control unit performs a control of suppressing a supply of an unburned gas from the internal combustion engine to the electrically heated catalyst so that the carrier retention unit is maintained at a lower temperature than the catalyst, when a condition for performing a fuel cut of the internal combustion engine during a deceleration is satisfied. Therefore, it is possible to suppress a rapid cooling of the catalyst, and it becomes possible to maintain a temperature of the carrier retention unit at a lower temperature than a temperature of the catalyst.

5 Claims, 8 Drawing Sheets

201: ACCELERATOR OPENING DEGREE SENSOR
202: VEHICLE SPEED SENSOR

VEHICLE CONTROL DEVICE

TECHNICAL FIELD

The present invention relates to a vehicle control device including an electrically heated catalyst on an exhaust passage.

BACKGROUND TECHNIQUE

Conventionally, there is proposed a technique for purifying an exhaust gas by using an electrically heated catalyst (hereinafter suitably referred to as "EHC") provided on an exhaust passage. For example, in Patent Reference-1, there is proposed an EHC including a ring-like mat member formed by an electrical insulating material, which has a shock-absorbing characteristic and is positioned between an outer periphery of a catalyst carrier and an inner periphery of a metal shell.

Hereinafter, a component which supports the catalyst in the EHC is referred to as "EHC carrier", and a component which retains the EHC carrier is referred to as "retention mat".

PRIOR ART REFERENCE

Patent Reference

Patent Reference-1: Japanese Patent Application Laid-open under No. 5-269387

DISCLOSURE OF INVENTION

Problem to be Solved by the Invention

Though the retention mat retaining the EHC carrier has an insulation property, the insulation property tends to change by a condition of the retention mat. For example, when a temperature of the retention mat becomes high, it is thought that an insulation resistance of the retention mat decreases. Therefore, since it can be said that the insulation property of the retention mat is not ensured in a high-temperature condition in which the temperature of the retention mat is higher than a predetermined temperature, it is preferable to prohibit applying a current to the EHC.

Meanwhile, when a fuel cut during a deceleration (hereinafter suitably referred to as "deceleration F/C") is performed, there is a tendency that the temperatures of the catalyst in the EHC and the retention mat decrease due to a supply of a gas with a relatively low temperature to the EHC. In this case, since the temperature of the catalyst decreases rapidly and the temperature of the retention mat decreases more slowly than that of the catalyst, there is a possibility that such a state that the temperature of the catalyst is lower than an activating temperature, but the retention mat is maintained at the high temperature occurs, for example. In the state, though it is preferable to apply the current to the EHC for warming the catalyst, there is a possibility that the current cannot be applied to the EHC due to the decrease in the insulation resistance caused by the high-temperature retention mat.

The present invention is made to solve the problem described above, and it is an object of the invention to provide a vehicle control device which can appropriately maintain a retention mat at a lower temperature than a catalyst in such a state that a deceleration F/C is performed, by suppressing a rapid cooling of the catalyst.

Means for Solving the Problem

According to one aspect of the present invention, there is provided a vehicle control device applied to a vehicle including an internal combustion engine and an electrically heated catalyst which is warmed by applying a current, and includes a catalyst carrier supporting a catalyst and a carrier retention unit that retains the catalyst carrier and has an electrical insulation property, including: a control unit which performs a control of suppressing a supply of an unburned gas from the internal combustion engine to the electrically heated catalyst so that the carrier retention unit is maintained at a lower temperature than the catalyst, when a condition for performing a fuel cut of the internal combustion engine during a deceleration is satisfied.

The above vehicle control device is preferably applied to the vehicle including the electrically heated catalyst (EHC) which purifies the exhaust gas of the internal combustion engine and is warmed by applying the current. The electrically heated catalyst includes the catalyst carrier supporting the catalyst and the carrier retention unit which retains the catalyst carrier and has the electrical insulation property. The catalyst carrier corresponds to the EHC carrier, and the carrier retention unit corresponds to the retention mat. When the condition for performing the fuel cut (F/C) of the internal combustion engine during the deceleration is satisfied, the control unit performs the control of suppressing the supply of the unburned gas from the internal combustion engine to the electrically heated catalyst so that the carrier retention unit is maintained at the lower temperature than the catalyst. Here, "unburned gas" indicates a gas (in other words, air) which is not burned in the internal combustion engine by performing the fuel cut, for example, and "unburned gas" does not include an uncombusted gas which is generated by the burning in the internal combustion engine. Hereinafter, the above unburned gas is suitably referred to as "cool air".

According to the vehicle control device, it is possible to suppress a rapid cooling of the electrically heated catalyst. As a result, it becomes possible to maintain a temperature of the carrier retention unit at a lower temperature than a temperature of the catalyst. Therefore, in such a state that the fuel cut during the deceleration is performed, since the temperature of the carrier retention unit is maintained at the lower temperature than the temperature of the catalyst, it tends not to prohibit applying the current to the electrically heated catalyst. Hence, it becomes possible to expand a range of a condition in which the current can be applied to the electrically heated catalyst.

In a manner of the above vehicle control device, the control unit prohibits performing the fuel cut so as to suppress supplying the unburned gas to the electrically heated catalyst.

According to the manner, the control unit prohibits performing the fuel cut during the deceleration, so as to perform the burning in the internal combustion engine and to supply the burned gas to the electrically heated catalyst. Therefore, it is possible to appropriately suppress the supply of the cool air to the electrically heated catalyst, and it becomes possible to suppress the rapid cooling of the catalyst.

In another manner of the above vehicle control device, the control unit performs a control of closing an intake valve and an exhaust valve in the internal combustion engine at the time of performing the fuel cut, so as to suppress supplying the unburned gas to the electrically heated catalyst.

According to the manner, the control unit performs the control of forcibly closing the intake valve and the exhaust valve at the time of performing the fuel cut, so as to cut off the supply of the gas generated by the fuel cut from the internal combustion engine to the electrically heated catalyst. Therefore, it is possible to appropriately suppress the supply of the cool air to the electrically heated catalyst, and it becomes possible to suppress the rapid cooling of the catalyst, too.

In another manner of the above vehicle control device, further including a valve control mechanism the control unit performs a control of closing a throttle valve at the time of performing the fuel cut so as to suppress supplying the unburned gas to the electrically heated catalyst, and when the control of closing the throttle valve is performed by the control unit, the valve control mechanism performs a control of making an overlap amount of an intake valve and an exhaust valve in the internal combustion engine larger than when the control of closing the throttle valve is not performed.

According to the manner, the control unit performs the control of closing the throttle valve at the time of performing the fuel cut, so as to decrease a supply amount of the gas generated by the fuel cut from the internal combustion engine to the electrically heated catalyst. Therefore, it is possible to appropriately suppress the supply of the cool air to the electrically heated catalyst, and it becomes possible to suppress the rapid cooling of the catalyst, too. Additionally, according to the manner, when the control unit performs the control of closing the throttle valve, the valve control mechanism performs the control of expanding the overlap amount of the intake valve and the exhaust valve at the same time. Concretely, when the control of closing the throttle valve is performed and the fuel cut is performed, the valve control mechanism performs the control of making the overlap amount larger than when a normal fuel cut is performed. Therefore, it is possible to appropriately suppress an increase in a negative pressure of an intake pipe due to the control of closing the throttle valve.

In another manner of the above vehicle control device, the vehicle is a hybrid vehicle for which an operation of the internal combustion engine is stopped during a deceleration at which a vehicle speed is equal to or lower than a predetermined speed, and the control unit performs a control of making a regenerative braking force by a motor generator in the hybrid vehicle larger so that the vehicle speed during the deceleration does not exceed the predetermined speed, so as to suppress supplying the unburned gas to the electrically heated catalyst.

According to the manner, the control unit performs the control of making the regenerative braking force applied to the vehicle larger so that the vehicle speed during the deceleration does not exceed the predetermined speed. Namely, the control unit enhances the regenerative braking force so that the vehicle speed decreases to equal to or lower than the predetermined speed. Therefore, since the operation of the internal combustion engine in the hybrid vehicle is stopped, it is possible to cut off the supply of the cool air to the electrically heated catalyst. Hence, it becomes possible to suppress the rapid cooling of the catalyst.

Preferably, when a temperature obtained by adding a predetermined temperature to a temperature of the carrier retention unit is equal to or higher than a temperature of the catalyst, the control unit suppresses supplying the unburned gas to the electrically heated catalyst. Therefore, it is possible to preliminarily perform the control of suppressing the supply of the cool air to the electrically heated catalyst before the temperature of the carrier retention unit exceeds the temperature of the catalyst.

DETAILED DESCRIPTION OF THE PREFERRED EMBODIMENTS

Preferred embodiments of the present invention will be explained hereinafter with reference to the drawings.

[Device Configuration]

Figure 1:
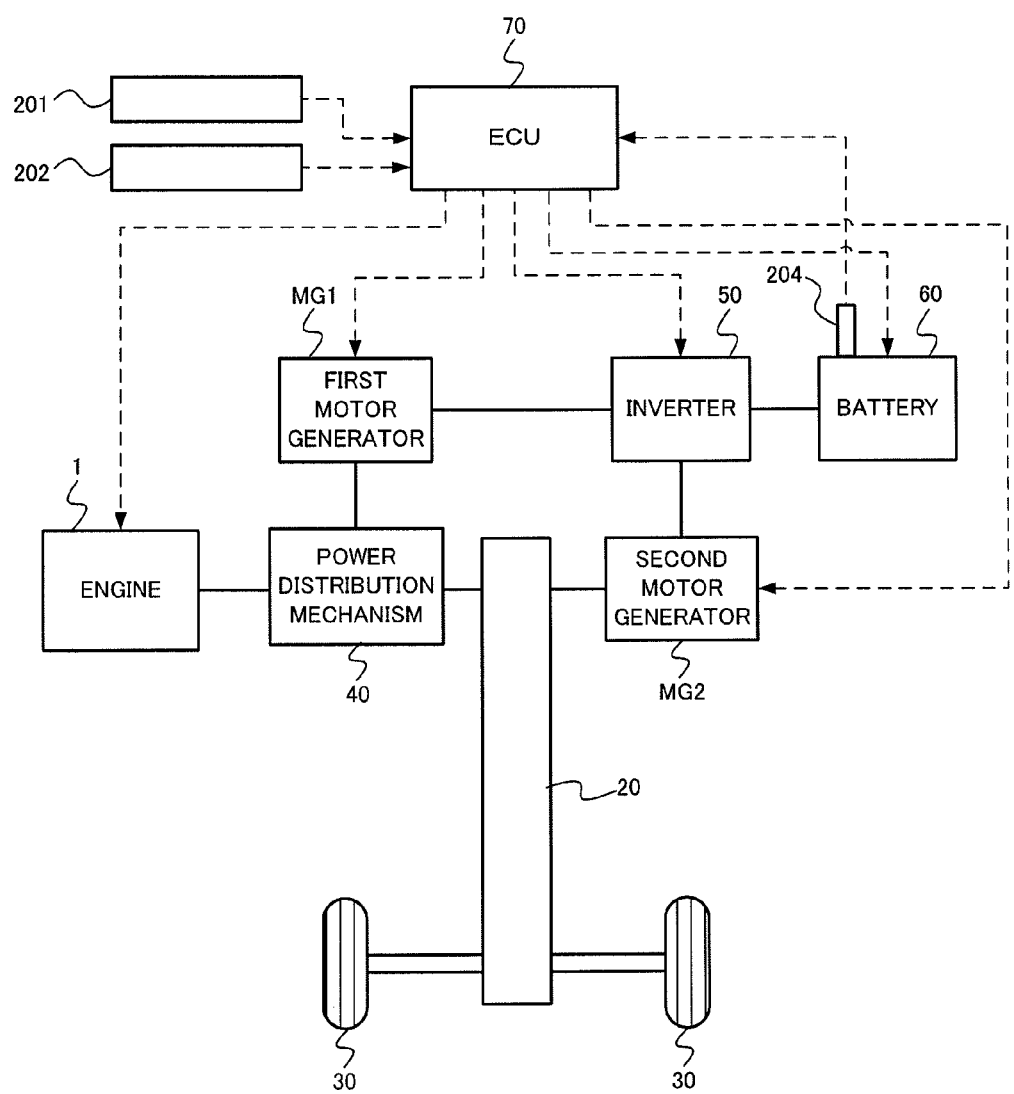
FIG. 1 shows a schematic configuration of a hybrid vehicle.

FIG. 1 shows a schematic configuration of a hybrid vehicle 100 in the embodiment. In FIG. 1, broken arrows show the input/output of signals.

The hybrid vehicle 100 mainly includes an engine (internal combustion engine) 1, an axle 20, wheels 30, a first motor generator MG1, a second motor generator MG2, a power distribution mechanism 40, an inverter 50, a battery 60 and an ECU (Electronic Control Unit) 70.

The axle 20 is a part of a power transmission system which transmits the power of the engine 1 and the second motor generator MG2 to the wheels 30. The wheels 30 are the wheels of the hybrid vehicle 100, and FIG. 1 especially shows only the right and left front wheels to simplify the explanation. The engine 1 is a gasoline engine, for example, and functions as a power source for outputting major driving force of the hybrid vehicle 100. For the engine 1, various controls are performed by the ECU 70.

The first motor generator MG1 is configured to function as a generator to mainly charge the battery 60 or a generator to supply the electric power to the second motor generator MG2, and performs the electric generation by the output of the engine 1. The second motor generator MG2 is configured to function as a generator to mainly assist the output of the engine 1. Additionally, the second motor generator MG2 functions as a regeneration brake during a braking such as an engine brake and a foot brake, and generates a braking force (regenerative braking force). Namely, the second motor generator MG2 has a regeneration capability of converting a kinetic energy into an electrical energy, and performs a regeneration operation so as to generate the electricity. The motor generators MG1 and MG2 are configured as a synchronous motor generator, for example, and include a rotor having plural permanent magnets on the outer circumferential surface and a stator around which three-phase coils are wound.

The power distribution mechanism 40 corresponds to the planetary gear having a sun gear and a ring gear, and is configured to distribute the output of the engine 1 to the first motor generator MG1 and the axle 20.

The inverter 50 is a DC/AC converter which controls the input/output of the electric power between the battery 60 and the first motor generator MG1, and controls the input/output of the electric power between the battery 60 and the second motor generator MG2. For example, the inverter 50 converts the AC electric power generated by the first motor generator MG1 to the DC electric power and supplies it to the battery 60. Additionally, the inverter 50 converts the DC electric power taken out from the battery 60 to the AC electric power and supplies it to the second motor generator MG2.

The battery 60 is configured to function as a power supply to drive the first motor generator MG1 and/or the second motor generator MG2, and to charge the electric power generated by the first motor generator MG1 and/or the second motor generator MG2. The battery 60 is provided with a SOC sensor 204 capable of detecting a state of charge (SOC) of the battery 60. The SOC sensor 204 provides the ECU 70 with a detection signal corresponding to the detected SOC.

In the following description, the expression of "motor generator MG" is used when the first motor generator MG1 and the second motor generator MG2 are not discriminated from each other.

The ECU 70 includes a CPU (Central Processing Unit), a ROM (Read Only Memory) and a RAM (Random Access Memory), and executes various controls to each constitutional elements in the hybrid vehicle 100. For example, the ECU 70 performs a control based on an accelerator opening degree detected by an accelerator opening degree sensor 201 and a vehicle speed detected by a vehicle speed sensor 202. As described later in detail, the ECU 70 corresponds to an example of the control unit in the present invention.

Figure 2:
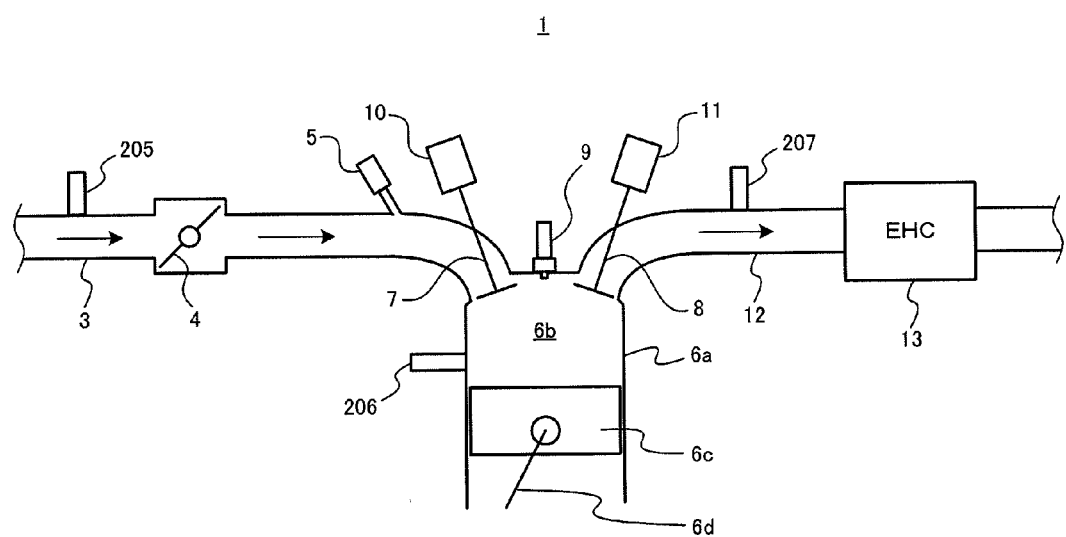
FIG. 2 shows a schematic configuration of an engine.

Next, a concrete description will be given of the engine 1, with reference to FIG. 2. FIG. 2 shows a schematic configuration of the engine 1.

The engine mainly includes an intake air passage 3, a throttle valve 4, a fuel injection valve 5, a cylinder 6a, an intake valve 7, an exhaust valve 8, a spark plug 9, an exhaust passage 12, an EHC (electrically heated catalyst) 13 and variable valve timing mechanisms 10 and 11. Though only one cylinder 6a is shown in FIG. 2 to simplify the explanation, the engine 1 actually includes plural cylinders 6a.

The intake air from the outside passes through the intake air passage 3, and the throttle valve 4 adjusts the flow amount of the gas passing through the intake air passage 3. For the throttle valve 4, the ECU 70 performs the control of the opening degree (throttle opening degree). The intake air passing through the intake air passage 3 is supplied to a combustion chamber 6b. The combustion chamber 6b is supplied with the fuel injected by the fuel injection valve 5, too. For the fuel injection valve 5, the ECU 70 performs the control of the fuel injection amount. For example, when the fuel cut is performed, the ECU 70 controls the fuel injection valve 5 so that the fuel injection is stopped.

The intake valve 7 and the exhaust valve 8 are provided on the combustion chamber 6b. By opening and closing the intake valve 7, the flow and cutoff of the intake air in the intake air passage 3 is switched. By opening and closing the exhaust valve 8, the flow and cutoff of the exhaust gas in the exhaust passage 12 is switched. Additionally, the variable valve timing mechanisms 10 and 11 control the valve timing of the intake valve 7 and the exhaust valve 8, respectively. The variable valve timing mechanisms 10 and 11 change the angle of action (in other words, lift amount) or the phase of the intake valve 7 and the exhaust valve 8. The variable valve timing mechanisms 10 and 11 are controlled by the ECU 70.

In the combustion chamber 6b, the fuel-air mixture of the intake air and the fuel burns by the ignition of the spark plug 9. For the spark plug 9, the ECU 70 performs the control of the ignition timing. The piston 6c is reciprocated by the burning, and the reciprocation is transmitted to a crank axis (which is not shown) via the con rod 6d. As a result, the crank axis rotates. The exhaust gas generated by the burning in the combustion chamber 6b is discharged to the exhaust passage 12.

The exhaust passage 12 is provided with the EHC 13 which purifies the exhaust gas and is warmed by applying the current. The EHC 13 will be described in details, later. Another catalyst (for example, three-way catalyst) may be provided on the exhaust passage 12 at the downstream position of the EHC 13.

Additionally, the engine 1 is provided with various sensors. An air flow meter 205 is provided on the intake air passage 3 and detects an intake air amount. A water temperature sensor 206 is provided on a passage in which cooling water for cooling the engine 1 flows, and detects a temperature of the cooling water (hereinafter referred to as "engine water temperature"). An air-fuel ratio sensor 207 is provided on the exhaust passage 12, and detects an air-fuel ratio (A/F) of the exhaust gas. These sensors provide the detection signals to the ECU 70.

Figure 3A:
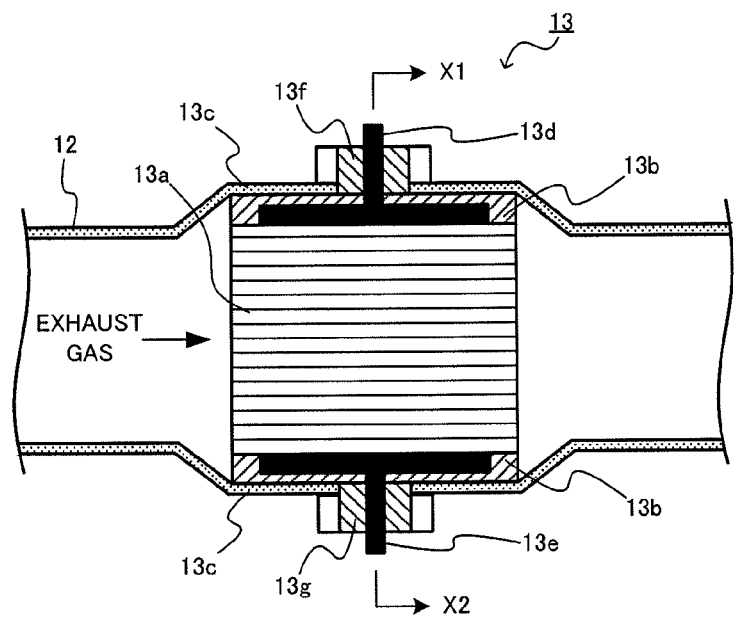
FIGS. 3A and 3B show schematic configurations of an EHC.
Figure 3B:
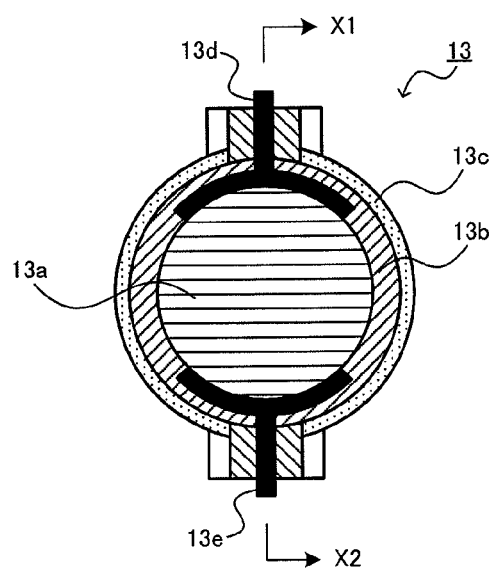

Next, a concrete description will be given of the EHC 13, with reference to FIGS. 3A and 3B. FIGS. 3A and 3B show schematic configurations of the EHC 13.

FIG. 3A shows a cross-sectional diagram view of the EHC 13 along a longitudinal direction of the exhaust passage 12. FIG. 3B shows a cross-sectional diagram view of the EHC 13 along a line X1-X2 in FIG. 3A. As shown in FIGS. 3A and 3B, the EHC 13 includes an EHC carrier 13a, a retention mat 13b, a case 13c, a positive electrode 13d, a negative electrode 13e and insulators 13f and 13g.

The EHC carrier 13a has a honeycombed cross-section, and supports the catalyst. For example, the EHC carrier 13a is formed by SiC (silicon dioxide). The EHC carrier 13a has the conductive property. The EHC carrier 13a corresponds to an example of the catalyst carrier. A sensor which detects a floor temperature of the catalyst in the EHC 13 (hereinafter referred to as "EHC floor temperature") may be provided on the EHC carrier 13a.

The retention mat 13b is positioned to cover the outer periphery of the EHC carrier 13a and the inner periphery of the case 13c, and retains the EHC carrier 13a. The retention mat 13b is formed by interweaving the fibrous metallic oxide such as alumina, and has the electrical insulation property. Additionally, the retention mat 13b has the thermal insulation property. The retention mat 13b corresponds to an example of the carrier retention unit. A sensor which detects a temperature of the retention mat 13b (hereinafter referred to as "retention mat temperature") may be provided on the retention mat 13b.

The case 13c is a chassis of the EHC 13 which is formed by the metallic material such as SUS. The case 13c is connected to the exhaust passage 12 via a connection member (which is not shown) at the upstream and downstream ends.

The positive electrode 13d is an electrode for applying the positive voltage, and the end of the positive electrode 13d is fixed on the periphery of the EHC carrier 13a. The negative electrode 13e is an electrode for applying the negative voltage, and the end of the negative electrode 13e is fixed on the periphery of the EHC carrier 13a. The positive electrode 13d and the negative electrode 13e are covered by the insulators 13f and 13g which are formed by the insulation material such as alumina, so as to maintain the electrically insulated condition.

As for the above EHC 13, when the positive voltage based on the potential of the negative electrode 13e is applied to the positive electrode 13d, the current flows through the EHC carrier 13a having the conductive material, and the EHC carrier 13a generates the heat. By the heat, the temperature of the catalyst supported by the EHC carrier 13a increases, and the catalyst immediately makes the transition to a catalyst activated state. The above configuration of the EHC 13 is an example. Various heretofore known manners can be applied to the configuration of the EHC carrier, the setting manner of each electrode and the control manner, for example.

Here, the above ECU 70 performs a control for warming the EHC 13 (namely, catalyst warming control). Concretely, the ECU 70 performs a control of heating the catalyst by applying the current to the EHC 13, or a control of heating the catalyst by the exhaust gas of the engine 1. Hereinafter, the control of heating the catalyst by applying the current to the EHC 13 is referred to as "catalyst warming by applying current", and the control of heating the catalyst by the exhaust gas of the engine 1 is referred to as "catalyst warming by engine". Specifically, when the EHC floor temperature is equal to or lower than a predetermined temperature, the ECU 70 performs the catalyst warming by applying the current or the catalyst warming by the engine 1, so as to maintain the EHC floor temperature equal to or higher than a temperature (namely, activating temperature) at which the catalyst in the EHC 13 exerts an optimum exhaust purification performance. Hereinafter, the predetermined temperature used for the determination of the EHC floor temperature is suitably referred to as "catalyst warming determination temperature". The catalyst warming determination temperature is set based on the activating temperature of the catalyst in the EHC 13. Basically, when the EHC floor temperature is equal to or lower than the catalyst warming determination temperature, the ECU 70 issues a request for applying the current to the EHC 13 for the purpose of the catalyst warming (hereinafter, the request is referred to as "request for applying current to EHC").

When the catalyst warming by applying the current is performed, the ECU 70 performs the control of making the hybrid vehicle 100 travel by using the output of the engine 1, for example. In contrast, when the catalyst warming by the engine 1 is performed, the ECU 70 performs the control of making the hybrid vehicle 100 travel by using the output of the motor generator MG, for example. Namely, a so-called "EV traveling" is performed. In this case, while the ECU 70 makes the engine 1 perform a driving corresponding to an idling driving, for example, the ECU 70 performs a control of delaying the ignition timing so as to increase the temperature of the exhaust gas.

[Basic Concept of Control Method]

Next, a description will be given of a basic concept of a control method performed by the ECU 70 in the embodiment.

In the embodiment, the ECU 70 performs the control so that the retention mat temperature is maintained at the lower temperature than the EHC floor temperature, in such a state that the fuel cut during the deceleration (namely, deceleration F/C) is performed. Concretely, when a condition for performing the deceleration F/C (hereinafter referred to as "deceleration F/C condition") is satisfied, the ECU 70 performs the control of suppressing a supply of an unburned cool air from the engine 1 to the EHC 13 so as to maintain the retention mat temperature at the lower temperature than the EHC floor temperature. In the specification, "cool air" indicates an air with at least lower temperature than a gas (exhaust gas) which is burned in the engine 1.

A concrete description will be given of a reason for performing the above control, with reference to FIG. 4 and FIG. 5.

Figure 4:
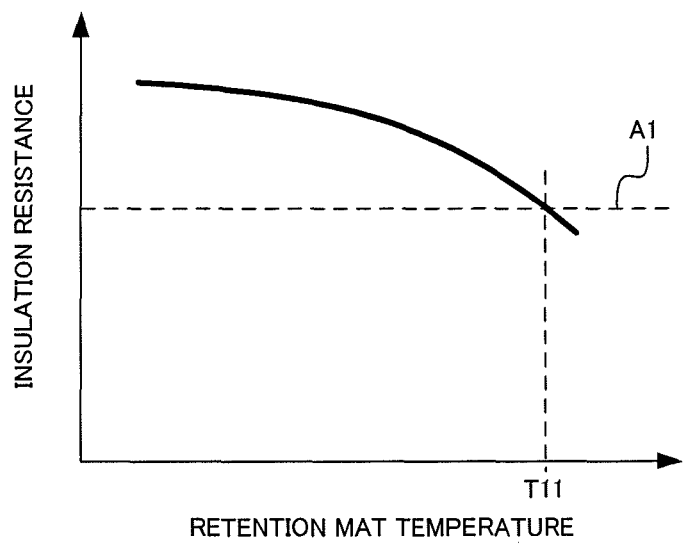
FIG. 4 shows an example of a relationship between a retention mat temperature and an insulation resistance of a retention mat.

FIG. 4 shows an example of a relationship between the retention mat temperature and the insulation resistance of the retention mat 13b. In FIG. 4, a horizontal axis shows the retention mat temperature, and a vertical axis shows the insulation resistance (corresponding to a volume intrinsic resistivity). Here, "insulation resistance" is represented by a numerical value corresponding to an insulation property between electrical circuits or between an electrical circuit and earth. When the numerical value of the insulation resistance becomes lower, an electrical leak tends to occur.

As shown in FIG. 4, when the temperature becomes higher, the insulation resistance tends to decrease due to the property of the alumina of the retention mat 13b, for example. Therefore, during a high speed driving and a high load driving in which the temperature of the exhaust gas becomes higher, the insulation resistance of the retention mat 13b tends to decrease due to the high-temperature retention mat 13b. Additionally, when the retention mat temperature becomes higher than a temperature T11, the insulation resistance of the retention mat 13b becomes lower than a value shown by a reference numeral A1. Therefore, the insulation property of the retention mat 13b cannot be ensured. Hereinafter, the value of the insulation resistance shown by the reference numeral A1 is referred to as "insulation resistance lower limit ensured value", and the retention mat temperature T11 corresponding to the insulation resistance lower limit ensured value A1 is referred to as "insulation ensured temperature". For example, the insulation ensured temperature is set to a temperature which is higher than the catalyst warming determination temperature. As an example, the catalyst warming determination temperature is set to 350 degrees Celsius, and the insulation ensured temperature is set to 500 degrees Celsius.

In the embodiment, when the retention mat temperature is higher than the insulation ensured temperature, the ECU 70 determines that the insulation property of the retention mat 13b is not ensured, and prohibits applying the current to the EHC 13. Namely, even if the request for applying the current to the EHC 13 is issued for the purpose of the catalyst warming, the ECU 70 prohibits performing the catalyst warming by applying the current.

Figure 5:
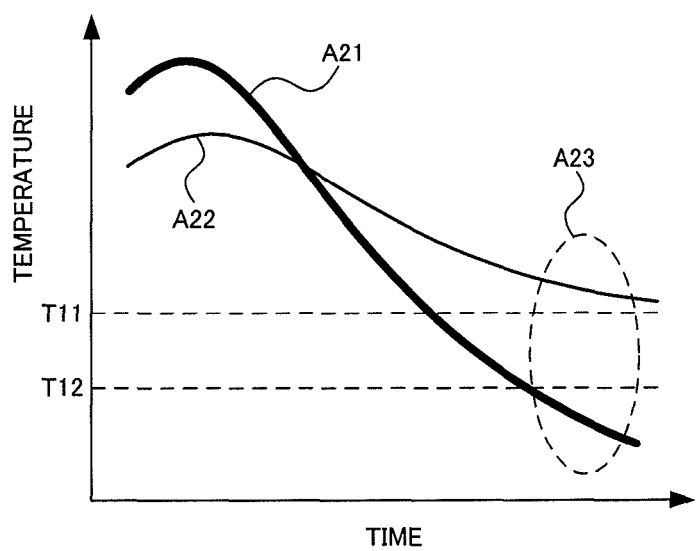
FIG. 5 shows an example of a temperature profile of an EHC floor temperature and a retention mat temperature.

FIG. 5 shows an example of a temperature profile of the EHC floor temperature and the retention mat temperature. In FIG. 5, a horizontal axis shows time, and a vertical axis shows a temperature. A graph A21 shows a time change of the EHC floor temperature, and a graph A22 shows a time change of the retention mat temperature. As shown by the graphs A21 and A22, it can be understood that both the EHC floor temperature and the retention mat temperature significantly decrease. For example, during the deceleration F/C, the above decreases in the EHC floor temperature and the retention mat temperature occur. In this case, it can be understood that the thermal difference between the EHC floor temperature and the retention mat temperature is generated. This is caused by a heat transfer at a boundary between the EHC carrier 13a and the retention mat 13b and a heat conduction in the retention mat 13b. Additionally, it can be understood that the change of the retention mat temperature is slower than the change of the EHC floor temperature. In other words, a time constant of the retention mat temperature is larger than that of the EHC floor temperature. This is caused by a heat capacity of each component in the EHC 13.

Additionally, in FIG. 5, the temperature T12 indicates the catalyst warming determination temperature, and the temperature T11 indicates the insulation ensured temperature. In this case, as shown by an area A23 represented by a broken line, it can be understood that such a state that the EHC floor temperature is lower than the catalyst warming determination temperature T12 and the retention mat temperature is higher than the insulation ensured temperature T11 occurs. In the state, though the request for applying the current to the EHC 13 is issued, since it can be said that the insulation property of the retention mat 13b is not ensured, the ECU 70 prohibits applying the current to the EHC 13. Namely, the ECU 70 prohibits performing the catalyst warming by applying the current to the EHC 13. In this case, the ECU 70 operates the engine 1, and performs the catalyst warming by the engine 1, for example. Therefore, there is a possibility that the deterioration of the fuel consumption occurs.

Thereby, in the embodiment, the ECU 70 performs the control so that such a state that the EHC floor temperature is lower than the catalyst warming determination temperature T12 and the retention mat temperature is higher than the insulation ensured temperature T11 does not occur. Namely, the ECU 70 performs the control so that the occurrence of the state shown by the area A23 is suppressed. Here, since the unburned cool air is supplied to the EHC 13 by the deceleration F/C, it is thought that the above state occurs due to the rapid cooling of the catalyst in the EHC 13. Namely, since the retention mat temperature exceeds the EHC floor temperature due to the rapid cooling of the catalyst, it is thought that the state occurs.

In the embodiment, when the deceleration F/C condition is satisfied, the ECU 70 performs the control of suppressing the supply of the cool air to the EHC 13 so that the retention mat temperature is maintained at the lower temperature than the EHC floor temperature. Therefore, it is possible to suppress the rapid cooling of the catalyst in the EHC 13. As a result, it becomes possible to maintain the retention mat temperature at the lower temperature than the EHC floor temperature. So, in such a state that the deceleration F/C is performed, since it is highly possible that the retention mat temperature is lower than the EHC floor temperature, it tends not to prohibit applying the current to the EHC. Hence, it becomes possible to expand a range of a condition in which the current can be applied to the EHC. Namely, when the EHC floor temperature becomes lower than the catalyst warming determination temperature, it becomes possible to appropriately perform the catalyst warming by applying the current.

Since the rapid cooling of the catalyst is suppressed by performing the control according to the embodiment, the EHC floor temperature tends not to become lower than the catalyst warming determination temperature, compared with the case of not performing the control according to the embodiment. Therefore, it is thought that the request for applying the current to the EHC 13 tends not to be issued.

Hereinafter, a concrete description will be given of control methods according to embodiments (first to fourth embodiments).

[First Embodiment]

In a first embodiment, when the deceleration F/C condition is satisfied, the ECU 70 prohibits performing the F/C during the deceleration so that the retention mat temperature is maintained at the lower temperature than the EHC floor temperature. Namely, in the first embodiment, the ECU 70 prohibits performing the F/C during the deceleration so that the burning is performed in the engine 1 and the burned gas is supplied to the EHC 13, so as to suppress the supply of the cool air to the EHC 13.

Specifically, when the deceleration F/C condition is satisfied and a temperature obtained by adding a predetermined temperature to the retention mat temperature is equal to or higher than the EHC floor temperature, the ECU 70 prohibits performing the above F/C. Namely, only when such a relationship that "retention mat temperature+predetermined temperature≥EHC floor temperature" is satisfied, the ECU 70 prohibits performing the F/C during the deceleration. In contrast, when such a relationship that "retention mat temperature+predetermined temperature≥EHC floor temperature" is not satisfied (i.e. when such a relationship that "retention mat temperature+predetermined temperature<EHC floor temperature" is satisfied), the ECU 70 permits to the F/C to be performed during the deceleration.

The reason why the F/C is prohibited by using such a relationship that "retention mat temperature+predetermined temperature≥EHC floor temperature" without using such a relationship that "retention mat temperature≥EHC floor temperature" is that the suppression of the supply of the cool air to the EHC 13 is preliminarily performed before the retention mat temperature exceeds the EHC floor temperature.

Figure 6:
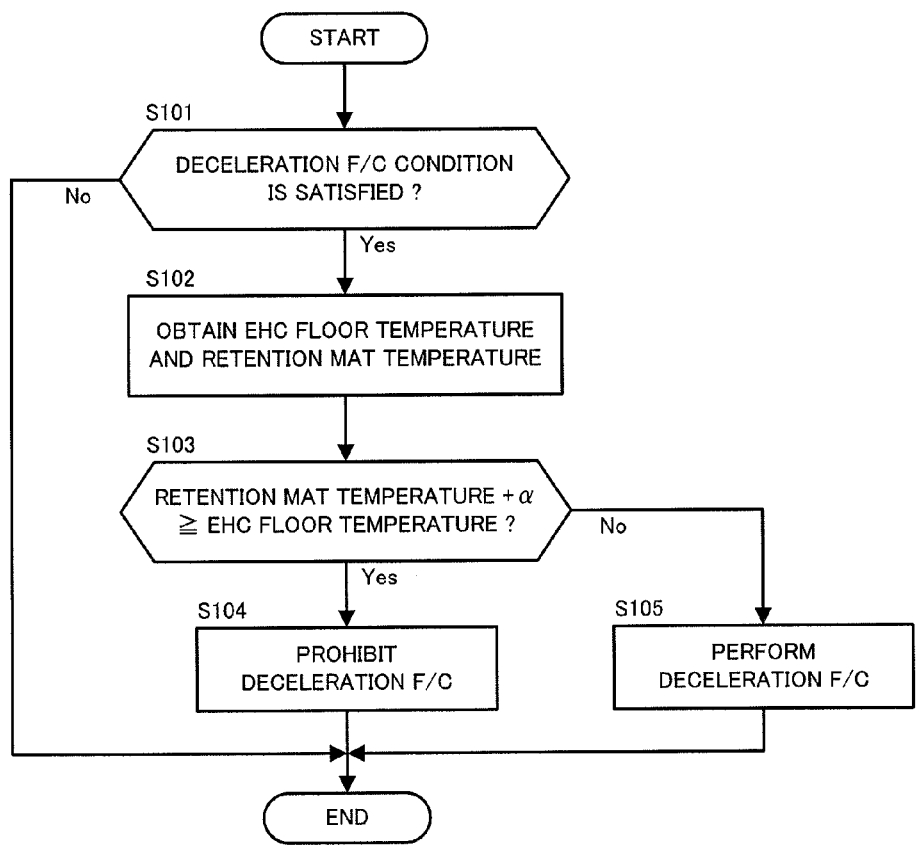
FIG. 6 is a flow chart showing a control process according to a first embodiment.

Next, a concrete description will be given of the control according to the first embodiment, with reference to FIG. 6. FIG. 6 is a flow chart showing a control process according to the first embodiment. The process is repeatedly executed by the ECU 70 in a predetermined cycle.

First, in step S101, the ECU 70 determines whether or not the deceleration F/C condition is satisfied. In other words, the ECU 70 determines whether or not the request for performing the F/C during the deceleration is issued. In this case, the ECU 70 determines whether or not the deceleration F/C condition is satisfied, based on the accelerator opening degree detected by the accelerator opening degree sensor 201 and the vehicle speed detected by the vehicle speed sensor 202. When the deceleration F/C condition is satisfied (step S101: Yes), the process goes to step S102. When the deceleration F/C condition is not satisfied (step S101: No), the process ends.

In step S102, the ECU 70 obtains the EHC floor temperature and the retention mat temperature. Concretely, the ECU 70 obtains the EHC floor temperature detected by the sensor provided on the EHC carrier 13a, and obtains the retention mat temperature detected by the sensor provided on the retention mat 13b. Then, the process goes to step S103.

It is not limited to use the EHC floor temperature and the retention mat temperature detected by the sensors. The EHC floor temperature and the retention mat temperature may be estimated based on predetermined parameters. Namely, instead of using actual measured values as the EHC floor temperature and the retention mat temperature, estimated values may be used as the EHC floor temperature and the retention mat temperature.

In step S103, the ECU 70 determines whether or not the temperature obtained by adding the predetermined temperature a to the retention mat temperature is equal to or higher than the EHC floor temperature. Namely, the ECU 70 determines whether or not such a relationship that "retention mat temperature+predetermined temperature $\alpha \geq$ EHC floor temperature" is satisfied. This determination is performed in order to switch the control in accordance with the relationship between the retention mat temperature and the EHC floor temperature, thereby to maintain the retention mat temperature at the lower temperature than the EHC floor temperature.

The predetermined temperature $\alpha$ corresponds to a margin which is set in order to determine a magnitude relation between the retention mat temperature and the EHC floor temperature. A predetermined fixed value may be used as the predetermined temperature $\alpha$, or a value which is changed in accordance with the state may be used as the predetermined temperature $\alpha$. For example, in such a case that it is desirable to increase a probability of maintaining the retention mat temperature at the lower temperature than the EHC floor temperature, the predetermined temperature a is set to a relatively large value. The predetermined temperature a may be set to "0".

When "retention mat temperature+predetermined temperature $\alpha \geq$ EHC floor temperature" is satisfied (step S103: Yes), the process goes to step S104. In step S104, the ECU 70 prohibits performing the deceleration F/C so that the retention mat temperature is maintained at the lower temperature than the EHC floor temperature. Namely, the ECU 70 prohibits performing the F/C during the deceleration (the deceleration itself is permitted) so that the burned gas in the engine 1 is supplied to the EHC 13, so as to suppress the supply of the cool air to the EHC 13. In this case, the ECU 70 controls the fuel injection valve 5 so that the same burning as the case of performing the normal deceleration is performed in the engine 1 (in other words, the same burning as the case of not performing the F/C during the deceleration is performed in the engine 1). Then, the process ends.

Meanwhile, when "retention mat temperature+predetermined temperature α≧EHC floor temperature" is not satisfied (step S103: No), the process goes to step S105. In this case, since the retention mat temperature is lower than the EHC floor temperature and the difference (absolute value) between the retention mat temperature and the EHC floor temperature is larger than the predetermined temperature α, the ECU 70 performs the deceleration F/C (step S105). Namely, the ECU 70 permits the F/C to be performed during the deceleration. Concretely, the ECU 70 controls the fuel injection valve 5 so that the fuel injection is stopped. Then, the process ends.

According to the above first embodiment, by prohibiting the deceleration F/C, it is possible to appropriately suppress the supply of the cool air from the engine 1 to the EHC 13. Therefore, according to the first embodiment, it is possible to suppress the rapid cooling of the catalyst, and it becomes possible to appropriately maintain the retention mat temperature at the lower temperature than the EHC floor temperature.

Additionally, since the burned gas is supplied to the EHC 13 by prohibiting the deceleration F/C, it is possible to appropriately suppress an excessive oxygen condition of the EHC 13. Therefore, it becomes possible to suppress the deterioration of the catalyst in the EHC 13.

[Second Embodiment]

Next, a description will be given of a second embodiment. The second embodiment is different from the first embodiment in that, when the deceleration F/C condition is satisfied and the temperature obtained by adding the predetermined temperature to the retention mat temperature is equal to or higher than the EHC floor temperature, a control of closing the intake valve 7 and the exhaust valve 8 is performed at the time of performing the F/C. Namely, in the second embodiment, without prohibiting the deceleration F/C, the control of setting the intake valve 7 and the exhaust valve 8 to a fully closed state (in other words, a control of stopping the intake valve 7 and the exhaust valve 8) is performed at the time of performing the F/C. Concretely, in the second embodiment, the intake valve 7 and the exhaust valve 8 are forcibly set to the fully closed state at the time of performing the F/C so that the supply of the gas generated by the F/C from the engine 1 to the EHC 13 is cut off, so as to suppress the supply of the cool air to the EHC 13.

Figure 7:
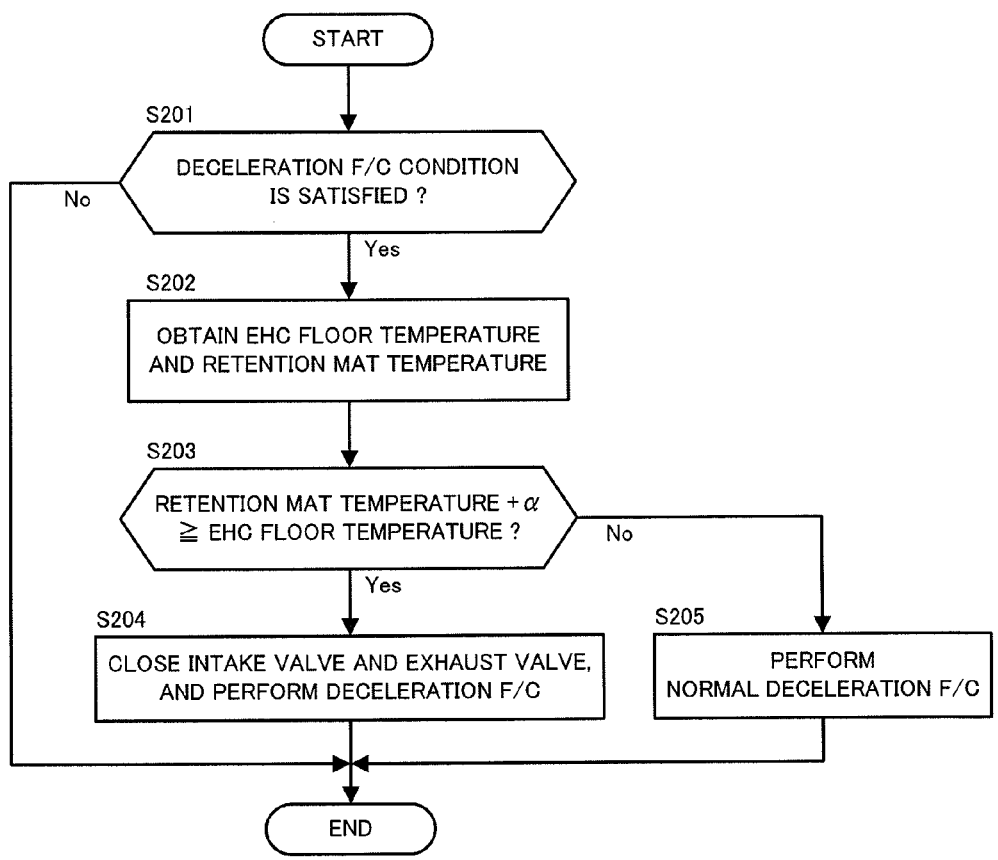
FIG. 7 is a flow chart showing a control process according to a second embodiment.

A concrete description will be given of the control according to the second embodiment, with reference to FIG. 7. FIG. 7 is a flowchart showing a control process according to the second embodiment. The process is repeatedly executed by the ECU 70 in a predetermined cycle.

Since processes in steps S201 to S203 are similar to the processes in steps S101 to S103 (see FIG. 6), explanations thereof are omitted. Here, a description will only be given of processes in steps S204 and S205.

The process in step S204 is performed when "retention mat temperature+predetermined temperature α≧EHC floor temperature" is satisfied (step S203: Yes). In step S204, the ECU 70 performs the deceleration F/C after closing the intake valve 7 and the exhaust valve 8, so as to maintain the retention mat temperature at the lower temperature than the EHC floor temperature. Namely, the ECU 70 forcibly sets the intake valve 7 and the exhaust valve 8 to the fully closed state at the time of performing the F/C (in other words, the ECU 70 stops the intake valve 7 and the exhaust valve 8), so as to cut off the supply of the gas generated by the F/C from the engine 1 to the EHC 13. In this case, the ECU 70 controls the variable valve timing mechanisms 10 and 11 so that the intake valve 7 and the exhaust valve 8 are stopped in the fully closed state, and controls the fuel injection valve 5 so that the fuel injection is stopped. Then, the process ends.

Meanwhile, the process in step S205 is performed when "retention mat temperature+predetermined temperature α≧EHC floor temperature" is not satisfied (step S203: No). In this case, since the retention mat temperature is lower than the EHC floor temperature and the difference (absolute value) between the retention mat temperature and the EHC floor temperature is larger than the predetermined temperature α, the ECU 70 performs the normal deceleration F/C (step S205). Namely, without forcibly setting the intake valve 7 and the exhaust valve 8 to the fully closed state, the ECU 70 operates the intake valve 7 and the exhaust valve 8 as usual, and performs the F/C during the deceleration. In this case, the ECU 70 controls the fuel injection valve 5 so that the fuel injection is stopped. Then, the process ends.

According to the above second embodiment, by closing the intake valve 7 and the exhaust valve 8 at the time of performing the F/C, it is possible to appropriately suppress the supply of the cool air from the engine 1 to the EHC 13. Therefore, according to the second embodiment, it is possible to suppress the rapid cooling of the catalyst, and it becomes possible to appropriately maintain the retention mat temperature at the lower temperature than the EHC floor temperature, too.

Additionally, since the gas supplied to the EHC 13 is cut off by closing the intake valve 7 and the exhaust valve 8 at the time of performing the F/C, it is possible to appropriately suppress the excessive oxygen condition of the EHC 13. Therefore, it becomes possible to suppress the deterioration of the catalyst in the EHC 13.

[Third Embodiment]

Next, a description will be given of a third embodiment. The third embodiment is different from the first and second embodiments in that, when the deceleration F/C condition is satisfied and the temperature obtained by adding the predetermined temperature to the retention mat temperature is equal to or higher than the EHC floor temperature, a control of closing the throttle valve 4 is performed at the time of performing the F/C (hereinafter, the control is referred to as "throttle closing control"). Namely, while the third embodiment is the same as the second embodiment in that the deceleration F/C is not prohibited, the third embodiment is different from the second embodiment in that the throttle closing control is performed instead of performing the control of closing the intake valve 7 and the exhaust valve 8. Concretely, in the third embodiment, the throttle closing control is performed at the time of performing the F/C so that a supply amount of the gas generated by the F/C from the engine 1 to the EHC 13 decreases, so as to suppress the supply of the cool air to the EHC 13.

Additionally, in the third embodiment, when the throttle closing control is performed, a control of expanding an overlap amount of the intake valve 7 and the exhaust valve 8 is performed at the same time (hereinafter, the control is referred to as "overlap expanding control"). Concretely, when the ECU 70 performs the throttle closing control and the deceleration F/C, the ECU 70 performs the control of making the overlap amount larger than when the normal deceleration F/C is performed. This is because an increase in a negative pressure of an intake pipe due to the throttle closing control is suppressed. Specifically, since there is a tendency that the negative pressure of the intake pipe increases due to a residual gas in the engine 1 (corresponding to the intake air during the F/C) which is blown back to the intake system at the time of performing the throttle closing control, the overlap amount is expanded so that an inside EGR increases, so as to suppress the increase in the negative pressure of the intake pipe. The overlap amount corresponds to a time period in which the intake valve 7 and the exhaust valve 8 are concurrently opened.

Figure 8:
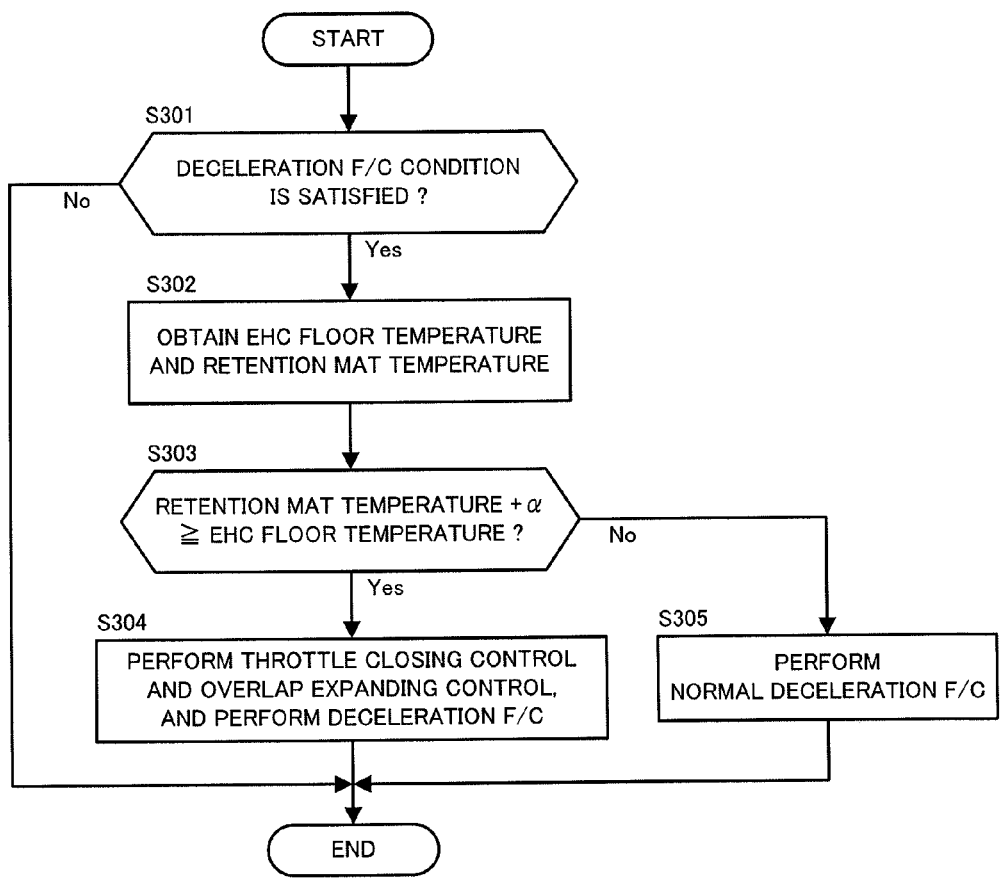
FIG. 8 is a flow chart showing a control process according to a third embodiment.

A concrete description will be given of the control according to the third embodiment, with reference to FIG. 8. FIG. 8 is a flow chart showing a control process according to the third embodiment. The process is repeatedly executed by the ECU 70 in a predetermined cycle.

Since processes in steps S301 to S303 are similar to the processes in steps S101 to S103 (see FIG. 6), explanations thereof are omitted. Here, a description will only be given of processes in steps S304 and S305.

The process in step S304 is performed when "retention mat temperature+predetermined temperature α≥EHC floor temperature" is satisfied (step S303: Yes). In step S304, the ECU 70 performs the deceleration F/C after performing the throttle closing control and the overlap expanding control, so as to maintain the retention mat temperature at the lower temperature than the EHC floor temperature. Namely, the ECU 70 performs the throttle closing control at the time of performing the F/C so that the supply amount of the gas generated by the F/C from the engine 1 to the EHC 13 decreases, and performs the overlap expanding control so that the increase in the negative pressure of the intake pipe due to the throttle closing control is suppressed. Concretely, the ECU 70 controls the throttle valve 4 so that the throttle valve 4 is set to the fully closed state, and controls the variable valve timing mechanisms 10 and 11 so that the overlap amount of the intake valve 7 and the exhaust valve 8 becomes larger than when the normal deceleration F/C is performed. In this case, the ECU 70 controls the variable valve timing mechanisms 10 and 11 so that the overlap amount is set to a predetermined amount, for example. Additionally, the ECU 70 controls the fuel injection valve 5 so that the fuel injection is stopped. Then, the process ends.

In the throttle closing control, it is preferable to set the throttle valve 4 to the fully closed state. However, when it is difficult to set the throttle valve 4 to the fully closed state due to a bite of the throttle valve 4, the throttle valve 4 may be set to a slightly opened side state rather than the fully closed state. As another example, the throttle closing control may be performed so that the throttle opening degree is set to an opening degree being at least smaller than the throttle opening degree which is set at the time of performing the normal deceleration F/C.

Meanwhile, the process in step S305 is performed when "retention mat temperature+predetermined temperature α≥EHC floor temperature" is not satisfied (step S303: No). In this case, since the retention mat temperature is lower than the EHC floor temperature and the difference (absolute value) between the retention mat temperature and the EHC floor temperature is larger than the predetermined temperature α, the ECU 70 performs the normal deceleration F/C (step S305). Namely, without performing the throttle closing control and the overlap expanding control, the ECU 70 operates the throttle valve 4, the intake valve 7 and the exhaust valve 8 as usual, and performs the F/C during the deceleration. In this case, the ECU 70 controls the fuel injection valve 5 so that the fuel injection is stopped. Then, the process ends.

According to the above third embodiment, by performing the throttle closing control at the time of performing the F/C, it is possible to appropriately suppress the supply of the cool air from the engine 1 to the EHC 13. Therefore, according to the third embodiment, it is possible to suppress the rapid cooling of the catalyst, and it becomes possible to appropriately maintain the retention mat temperature at the lower temperature than the EHC floor temperature, too.

Additionally, according to the third embodiment, by performing the overlap expanding control when the throttle closing control is performed, it is possible to appropriately suppress the increase in the negative pressure of the intake pipe due to the throttle closing control.

[Fourth Embodiment]

Next, a description will be given of a fourth embodiment. The fourth embodiment is different from the first to third embodiments in that, when the deceleration F/C condition is satisfied and the temperature obtained by adding the predetermined temperature to the retention mat temperature is equal to or higher than the EHC floor temperature, a control of making the regenerative braking force by the motor generator MG larger is performed so that the vehicle speed during the deceleration does not exceed the predetermined speed. Hereinafter, the control is referred to as "regeneration brake enhancing control". The reason for performing the above control is as follows.

As for the hybrid vehicle 100, when the vehicle speed is equal to or lower than the predetermined speed, the operation of the engine 1 tends to be stopped. Specifically, when the vehicle speed is equal to or lower than the predetermined speed and a request for outputting the driving power from the engine 1 (hereinafter referred to as "engine power request") is not issued, the operation of the engine 1 is stopped. In this case, the clutch which connects the output axis of the engine 1 to the drive axis of the hybrid vehicle 100 is released so as to stop the engine 1. Hereinafter, the above control is referred to as "engine separating control".

Meanwhile, when the vehicle speed is higher than the predetermined speed, the operation of the engine 1 tends to be continued. In this case, the clutch which connects the output axis of the engine 1 to the drive axis of the hybrid vehicle 100 is engaged so as to perform an accompanying operation of the engine 1. Hereinafter, the above control is referred to as "engine connecting control". When the deceleration is performed at the vehicle speed higher than the predetermined speed, since the operation of the engine 1 is continued, the deceleration F/C tends to be performed.

In the fourth embodiment, the control is performed so as to suppress performing the above deceleration F/C. Concretely, since there is a tendency that the deceleration F/C is performed in such a case that the accompanying operation of the engine 1 is performed during the deceleration at which the vehicle speed is higher than the predetermined speed, the control according to the fourth embodiment is performed so that the vehicle speed during the deceleration does not exceed the predetermined speed. Specifically, when the deceleration F/C condition is satisfied and the temperature obtained by adding the predetermined temperature to the retention mat temperature is equal to or higher than the EHC floor temperature, the ECU 70 performs the control (regeneration brake enhancing control) of enhancing the regenerative braking force which is applied to the hybrid vehicle 100 during the deceleration, so that the vehicle speed during the deceleration does not exceed the predetermined speed. Namely, when the vehicle speed during the deceleration is higher than the predetermined speed, the ECU 70 performs the regeneration brake enhancing control so that the vehicle speed decreases to equal to or lower than the predetermined speed.

Therefore, the vehicle speed decreases to equal to or lower than the predetermined speed, and the engine 1 is stopped. Namely, the engine 1 is separated. Hence, since the gas from the engine 1 is not supplied to the EHC 13, it is possible to appropriately cut off the supply of the cool air from the engine 1 to the EHC 13.

In such a state that the engine 1 is stopped, the engine 1 does not virtually operate and the number of engine revolutions is not generated. In contrast, in such a state that the F/C is performed, since the fuel injection is only stopped, the engine 1 operates and the number of engine revolutions is generated.

Figure 9:
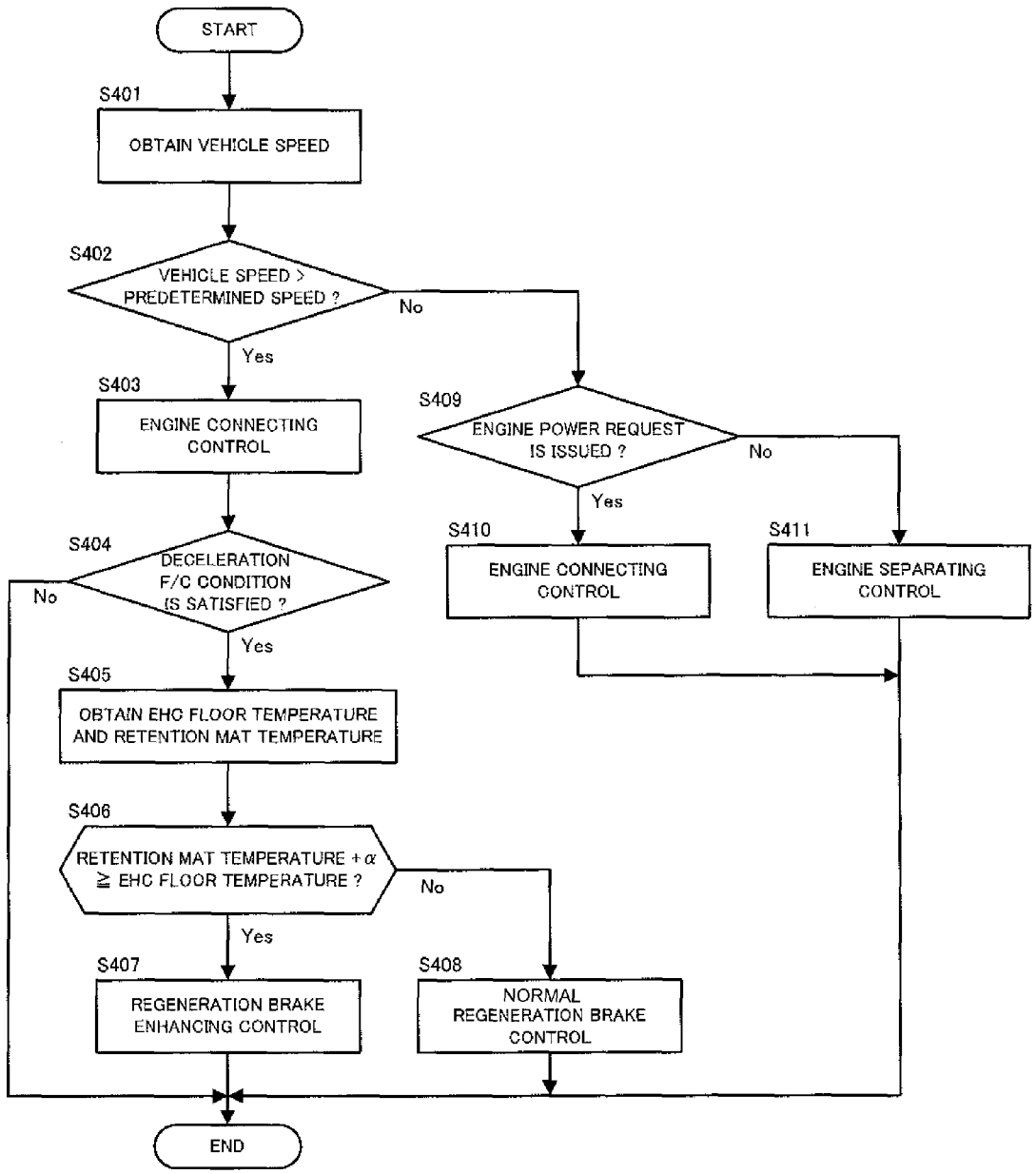
FIG. 9 is a flow chart showing a control process according to a fourth embodiment.

A concrete description will be given of the control according to the fourth embodiment, with reference to FIG. 9. FIG. 9 is a flow chart showing a control process according to the fourth embodiment. The process is repeatedly executed by the ECU 70 in a predetermined cycle.

First, in step S401, the ECU 70 obtains the vehicle speed detected by the vehicle speed sensor 202. Then, the process goes to step S402. In step S402, the ECU 70 determines whether or not the vehicle speed obtained in step S401 is higher than the predetermined speed. The predetermined speed is used for determining whether to operate the engine 1 or to stop the engine 1. In other words, the predetermined speed is used for determining whether to connect the engine 1 or to separate the engine 1. For example, the predetermined speed is set to 100 [km/h].

When the vehicle speed is higher than the predetermined speed (step S402: Yes), the process goes to step S403. In this case, the ECU 70 performs the engine connecting control (step S403). Then, the process goes to step S404.

Since processes in steps S404 to S406 are similar to the processes in steps S101 to S103 (see FIG. 6), explanations thereof are omitted. Here, a description will only be given of processes in steps S407 to S411.

The process in step S407 is performed when "retention mat temperature+predetermined temperature α≧EHC floor temperature" is satisfied (step S406: Yes). In step S407, the ECU 70 performs the regeneration brake enhancing control. Namely, the ECU 70 performs the control of enhancing the regenerative braking force which is applied to the hybrid vehicle 100 during the deceleration, so that the vehicle speed decreases to equal to or lower than the predetermined speed and the engine 1 is stopped. The control is performed in order to cut off the supply of the cool air to the EHC 13 by stopping the engine 1, thereby to maintain the retention mat temperature at the lower temperature than the EHC floor temperature. In this case, the ECU 70 controls the second motor generator MG2 so that the regenerative braking force which can decrease the vehicle speed to equal to or lower than the predetermined speed is generated. Then, the process ends.

In contrast, the process in step S408 is performed when "retention mat temperature+predetermined temperature α≧EHC floor temperature" is not satisfied (step S406: No). In step S408, the ECU 70 performs the normal regeneration brake control. In this case, since the retention mat temperature is lower than the EHC floor temperature and the difference (absolute value) between the retention mat temperature and the EHC floor temperature is larger than the predetermined temperature α, without performing the above regeneration brake enhancing control for the purpose of cutting off the supply of the cool air to the EHC 13, the ECU 70 performs the normal regeneration brake control in accordance with the request of the deceleration. For example, the ECU 70 controls the second motor generator MG2 so that the braking force in accordance with the operation of the brake is generated. Then, the process ends.

Meanwhile, when the vehicle speed is equal to or lower than the predetermined speed (step S402: No), the process goes to step S409. In step 409, based on the accelerator opening degree detected by the accelerator opening degree sensor 201, the ECU 70 determines whether or not the engine power request is issued. When the engine power request is issued (step S409: Yes), the process goes to step S410. In this case, the ECU 70 performs the engine connecting control (step S410), and then the process ends. In contrast, when the engine power request is not issued (step S409: No), the process goes to step S411. In this case, the ECU 70 performs the engine separating control (step S411), and then the process ends.

According to the above fourth embodiment, by performing the regeneration brake enhancing control so that the vehicle speed decreases to equal to or lower than the predetermined speed, it is possible to appropriately suppress the supply of the cool air from the engine 1 to the EHC 13. Therefore, according to the fourth embodiment, it is possible to suppress the rapid cooling of the catalyst, and it becomes possible to appropriately maintain the retention mat temperature at the lower temperature than the EHC floor temperature, too.

There is a possibility that the deceleration at the time of performing the regeneration brake enhancing control is different from the deceleration at the time of performing the normal regeneration brake control. Additionally, there is a possibility that the difference in the deceleration occurs at the time of separating the engine 1 after performing the regeneration brake enhancing control. Therefore, it is preferable to adjust an energy recovered by the regenerative braking so that an uncomfortable feeling by the above difference in the deceleration does not occur. For example, the second motor generator MG2 can be controlled so that the energy recovered by the regenerative braking gradually increases, so as to suppress the uncomfortable feeling by the difference in the deceleration.

While the above fourth embodiment shows such an example that the regeneration brake enhancing control is performed in order to suppress performing the deceleration F/C, the deceleration F/C may be prohibited in such a state that the regeneration brake enhancing control is performed. Namely, when the deceleration F/C condition is satisfied and the temperature obtained by adding the predetermined temperature to the retention mat temperature is equal to or higher than the EHC floor temperature, the F/C during the deceleration may be prohibited as well as performing the regeneration brake enhancing control. Therefore, since the F/C is not performed until the vehicle speed decreases to equal to or lower than the predetermined speed by the regeneration brake enhancing control (in the time period, the engine 1 is operated), it is possible to appropriately suppress the supply of the cool air to the EHC 13.

[Modification]

While the above embodiments show such an example that the hybrid vehicle is controlled, the control methods shown in the above embodiments (excluding the control method shown in the fourth embodiment) can be applied to a normal vehicle other than the hybrid vehicle, too. Additionally, the control methods shown in the above embodiments can be applied to a so-called "plug-in hybrid vehicle", too.

DESCRIPTION OF REFERENCE NUMBERS

1 Engine
4 Throttle Valve

5 Fuel Injection Valve
7 Intake Valve
8 Exhaust Valve
12 Exhaust Passage
13 EHC (Electrically Heated Catalyst)
13a EHC Carrier
13b Retention Mat
70 ECU
100 Hybrid Vehicle
MG1 First Motor Generator
MG2 Second Motor Generator

The invention claimed is:

1. A vehicle control device applied to a vehicle including an internal combustion engine and an electrically heated catalyst which is warmed by applying a current, and includes a catalyst carrier supporting a catalyst and a carrier retention unit that retains the catalyst carrier and has an electrical insulation property, comprising:
a control unit which performs a control of suppressing a supply of air from the internal combustion engine to the electrically heated catalyst so that the carrier retention unit is maintained at a lower temperature than the catalyst, when a condition for performing a fuel cut of the internal combustion engine during a deceleration is satisfied, and wherein, when a temperature obtained by adding a predetermined temperature to a temperature of the carrier retention unit is equal to or higher than a temperature of the catalyst, the control unit suppresses supplying the air to the electrically heated catalyst.

2. The vehicle control device according to claim 1,
wherein the control unit prohibits performing the fuel cut so as to suppress supplying the air to the electrically heated catalyst.

3. The vehicle control device according to claim 1,
wherein the control unit performs a control of closing an intake valve and an exhaust valve in the internal combustion engine at the time of performing the fuel cut, so as to suppress supplying the air to the electrically heated catalyst.

4. The vehicle control device according to claim 1, further comprising a valve control mechanism,
wherein the control unit performs a control of closing a throttle valve at the time of performing the fuel cut so as to suppress supplying the air to the electrically heated catalyst, and
wherein, when the control of closing the throttle valve is performed by the control unit, the valve control mechanism performs a control of making an overlap amount of an intake valve and an exhaust valve in the internal combustion engine larger than when the control of closing the throttle valve is not performed.

5. The vehicle control device according to claim 1,
wherein the vehicle is a hybrid vehicle for which an operation of the internal combustion engine is stopped during a deceleration at which a vehicle speed is equal to or lower than a predetermined speed, and
wherein the control unit performs a control of making a regenerative braking force by a motor generator in the hybrid vehicle larger so that the vehicle speed during the deceleration does not exceed the predetermined speed, so as to suppress supplying the air to the electrically heated catalyst.

* * * * *